3,071,439
METHOD FOR THE PREPARATION OF
TITANIUM HYDRATE
Monroe M. Solomka, Bilbao, Spain, assignor to Dow Unquinesa, S.A., Axpe-Bilbao, Spain, a corporation of Spain
No Drawing. Filed Jan. 27, 1960, Ser. No. 4,890
3 Claims. (Cl. 23—202)

This invention relates to novel methods for the preparation of titanium hydrates suitable for the manufacture of titanium pigments which have good color and high covering power. More particularly, the invention concerns the preparation of titanium hydrates from ilmenite solutions by direct hydrolysis without prior removal of the iron content and concentration of such solutions, and the seeding of the water employed for hydrolysis.

The principal raw material used in the manufacture of titanium dioxide pigments is ilmenite, a natural titanate of iron. However, titanium-bearing slags are also used extensively.

In accordance with conventional industrial processes, ilmenite ore is dried and ground and reacted with sulfuric acid to produce a solid porous cake which is dissolved in water to form a solution of titanium sulfate, iron sulfate, and acid. The amount of sulfuric acid used to react with the ilmenite is calculated to combine with the titanium present in an amount less than that required to form $Ti(SO_4)_2$, so that the resulting solution is termed basic. The iron present reacts with the sulfuric acid to form iron sulfate. Some of the iron present is in the ferric condition and is reduced to the ferrous condition by addition of scrap iron. The scrap iron also reduces a small portion of the titanium sulfate to titanous sulfate, which serves to prevent oxidation of the iron during the later steps in the process. The ilmenite solution is then clarified to remove unreacted ore and other suspended matter.

It is standard practice in the titanium pigment industry to remove a major proportion of the dissolved iron from the ilmenite solution in the form of crystal copperas ($FeSO_4 \cdot 7H_2O$) to reduce the iron content to what is customarily considered a desirable minimum. This crystallization is accomplished by cooling or vacuum cooling the solution. The ilmenite solution is then usually concentrated to a titanium content of approximately 250 grams per liter of $TiO_2$. Where titanium bearing slag is used as the raw material, the crystallization step is generally unnecessary because of the low iron content of solutions prepared from such slag, but the slag solution must nevertheless be subject to a concentration step.

In accordance with prevailing practice in the industry, the crystallized and concentrated ilmenite or the concentrated slag solution is hydrolyzed to convert the soluble titanium sulfate into an insoluble titanium hydrate. The method of hydrolysis most widely employed is the so-called Blumenfeld procedure, which is described typically in Reissue Patent No. 18 854, Example I, although the quantities there shown can be varied. The Blumenfeld procedure has as its basis the hydrolysis of a basic titanium sulfate solution by means of autonucleation followed by boiling. This is carried out by slowly adding titanium sulfate solution, either at ambient temperature or preheated, to a definite quantity of heated water at a definite rate, and then boiling the mixture until the desired yield is obtained. Autonucleation occurs in the first minute or so after the addition of the first portion of the solution to the water, the mixture becoming milky. The milkiness then redissolves on further addition of titanium solution in the next few minutes. The initially formed $TiO_2$ in milky form is believed to constitute nuclei facilitating subsequent hydrolysis and the production of a titanium hydrate with the desired physical and chemical characteristics and yield.

The Blumenfeld procedure produces a titanium hydrate which, after the customary filtering, washing, conditioning, calcination, and milling steps, forms a high quality titanium dioxide pigment having the anatase crystal form.

The equipment required for the operations of copperas crystallization, filtration, and concentration of the resulting titanium sulfate solution, represents an appreciable proportion of the total investment in a titanium pigment plant, and moreover involves additional handling of extremely corrosive materials. In addition, there is inherent in these steps an important part of the operating and maintenance cost. The cost of the steam consumed by the vacuum crystallization and concentration can be very significant in locations where steam generating charges or fuel prices are high.

Concomitantly, there is the factor of disposal of copperas, a product ordinarily having not only limited markets, but which faces competition from copperas available from iron and steel pickling operations. The objective of eliminating the steps of iron crystallization, copperas filtration, and titanium solution concentration has been approached in the industry by a tendency toward the use of available titanium bearing slags which are lower in iron content than ilmenite and higher in titanium content, avoiding the necessity at least of the iron removal step, although not the need for solution concentration. This process simplification together with the need for somewhat less sulfuric acid more than compensates for the substantially higher cost of the titanium slags. However, the problem of eliminating crystallization and concentration and utilizing the resulting solution had remained unsolved prior to the present invention.

Before the general adoption of the Blumenfeld procedure by the industry, it had been suggested that pigment quality titanium dioxide could be obtained by conducting the hydrolysis of ilmenite solutions without previous removal of the iron by crystallization, and even in the presence of large amounts of iron, provided that the acid and combined sulfate concentrations were first suitably adjusted, and that a seeding agent was employed. A procedure of this type is disclosed in U.S. Patent 2,182,420, disclosing the addition of soluble sulfates which will not hydrolyze with the titanium sulfate, such as the sulfates of magnesium, tin, aluminum, zinc, sodium, potassium, and ammonium. However, this procedure, despite the suggestion of retention of iron, had always been considered by the industry as unsuitable for use in conjunction with the Blumenfeld procedure, which involves self-seeding, it being considered that the presence of such large amounts of iron in the Blumenfeld procedure would be hazardous and would impair the quality of the resulting titanium hydrates.

Prior to the present invention, it had been the prevailing view in the industry that ilmenite solutions, before hydrolysis, must be concentrated to a $TiO_2$ concentration of at least 200 g.p.l. to produce a good quality pigment, using modern techniques. I found that the importance of the concentration step as currently employed in the industry lay not in increasing the $TiO_2$ concentration, but rather in that the $Fe^{++}$ concentration was simultaneously increased. Moreover, I found that, contrary to prevalent opinion, it was actually undesirable to remove the iron from the solution, and I established that it was precisely the reduction in iron content that necessitated subsequent concentration, ostensibly to restore $TiO_2$ concentration, but really to augment $Fe^{++}$ concentration. I have found that the less the iron is removed, the less the solution need be concentrated in order to be suitable for producing a high grade pigment using the Blumenfeld procedure.

Thus, I have found that the ordinary titanium solution produced by the reaction of ilmenite with sulfuric acid, after clarification, can be hydrolyzed directly to produce a good grade of titanium hydrate, and without the addition of any other soluble sulfate or seed, by adding a quantity of this solution, preferably heated, to heated water, and then boiling. The resulting hydrate, after washing, treating, calcining and milling, in accordance with customary procedures, produces a titanium pigment of a quality equal to the top quality anatase pigment now available on the market generally. Moreover, rutile seed, as disclosed in Patent 2,494,492, can be added, preferably in the bleaching step during washing, to produce a rutile pigment of excellent quality.

Thus, clarified original ilmenite solutions, if care is taken that no iron is removed, as by cooling, can be hydrolyzed directly using the conventional Blumenfeld procedure to obtain pigments as good as those by presently known methods.

In accordance with the present invention, therefore, it has been found, surprisingly and unexpectedly, that an uncrystallized and unconcentrated ilmenite solution as defined above can be successfully employed in the Blumenfeld procedure, and that the hydrolysis of the solution with hot water in accordance with the Blumenfeld procedure can be successfully carried out with production of a satisfactory grade of titanium hydrate even though all the iron originally present is permitted to remain in the solution. The retention of ferrous ion in the ilmenite solution in amounts formerly regarded as hazardous in fact results in facilitating the formation of titanium dioxide in optimum particle size. Conversely, the removal of the iron actually hinders or makes impossible the subsequent production of a titanium pigment of suitable particle size unless the solution is afterward concentrated prior to its hydrolysis.

There can also serve as a starting material for my novel process a solution of ilmenite and a suitable proportion, for example 5% or more of a titanium-bearing slag. This eliminates the necessity for reduction using scrap iron.

Thus, the present invention eliminates the iron crystallization and filtration steps, as well as the concentration step, and involves no additions to the ilmenite solution. A marked simplification of the presently used industrial process is provided, while at the same time the production of high quality pigment is assured.

However, when employing uncrystallized and unconcentrated ilmenite solutions directly in the Blumenfeld hydrolysis procedure, process conditions must be very carefully controlled in order to obtain optimum results. Without such control, considerable variation will be found from batch to batch (the hydrolysis being a batch procedure), and the product will tend toward nonuniformity.

In accordance with another aspect of the invention, the further discovery has been made that the need for such conditions of careful control can be substantially eliminated by means of a novel seeding agent and method to be employed in connection with the Blumenfeld procedure where the ilmenite solution to be hydrolyzed is uncrystallized and unconcentrated. This novel seeding method comprises adding to the hot hydrolysis water a small amount of a conventional crystallized and concentrated ilmenite solution obtainable from the usual processing of ilmenite prior to hydrolysis. The addition of the latter to the hydrolysis water serves to effect autonucleation and thus provides seed for the entire operation. Such addition is followed immediately by the addition to the hot water thus treated, of the uncrystallized and unconcentrated ilmenite solution which is to be hydrolyzed.

Consequently, by employing uncrystallized and unconcentrated ilmenite solution as a starting material in conjunction with the Blumenfeld hydrolysis procedure, and by combining this with a modification of the Blumenfeld procedure whereby small amounts of crystallized and concentrated ilmenite solution are used as a seeding means, the Blumenfeld procedure is facilitated and the fine controls of operating conditions which would otherwise be required with uncrystallized and unconcentrated ilmenite solution, are substantially eliminated.

In carrying out the process of the present invention, there may be employed any commercially available ilmenite ores conventionally used for titanium hydrate production, preferably those ores which are low in impurties known to be disadvantageous to titanium pigment manufacture, such as, for example, chromium and vanadium. A suitable grade of ilmenite ore will assay from about 44% to about 60% $TiO_2$.

In order to prepare the ilmenite solution which serves as the starting material for my novel process, ilmenite is dried and finely ground, to a degree of fineness such that a residue of less than about 2% remains on a 200 mesh sieve. The finely divided ore is then treated with a sufficient amount of concentrated sulfuric acid (90% to 100% $H_2SO_4$) so that the solution of ilmenite has an acid ratio by weight ($H_2SO_4:TiO_2$) ranging from about 1.8:1 to about 2.1:1. The reaction is promoted with steam or a small amount of water and is carried out in accordance with conventional procedure, in a lead-lined or acid-brick lined vat. There is formed a porous cake, which is dissolved in water. Scrap iron is added to the solution in order to reduce all the iron present to the ferrous state. The scrap iron also serves to reduce a small portion of the titanium to the titanous form. The presence of the latter serves to avoid oxidation of the ferrous iron. The ilmenite solution is then coagulated using conventional coagulants such as glue and the like, to precipitate the slime, and is allowed to settle. The clarified solution is decanted and filtered by any suitable means, for example, by means of a plate and frame filter press. The resulting ilmenite solution is ready to serve as the starting material for hydrolysis to titanium hydrate in accordance with the novel procedures of this invention.

The starting ilmenite solution prepared as described will average in titanium dioxide content from about 110 to about 150 grams per liter, depending upon the quality of the ilmenite used, and will have an iron content, expressed as ferrous ion ($Fe^{++}$), ranging from about 110 to about 120 g.p.l. It has been found that, provided the ferrous ion content is maintained above about 80 g.p.l., this ilmenite solution is directly adapted to be used in titanium dioxide production via the Blumenfeld hydrolysis procedure, and without further concentration. No iron removal is contemplated or necessary. Even the presence of amounts of ferrous ion exceeding 120 g.p.l. does not adversely affect the hydrolysis or the quality of the resulting pigment when the Blumenfeld procedure is used.

In accordance with the invention, the filtered ilmenite solution containing the ferrous iron, and unconcentrated, is added directly to heated water gradually and with mechanical agitation, the proportion of ilmenite solution being such that it constitutes from about 75% to about 96% of the total volume of ilmenite solution and water. The optimum ratio of ilmenite solution to water will depend upon the characteristics of the ilmenite solution to be hydrolyzed and must be determined empirically, but will fall within the indicated range. The ilmenite solution itself may be at ambient temperature, but it is preferably preheated to a temperature between about 90° and about 100° C. because of its relatively large volume. The water to which the ilmenite solution is to be added is preheated to a temperature between about 85° and about 100° C. The particular temperatures selected must also be determined empirically, by test hydrolyses at various temperatures, to yield a pigment having optimum characteristics. It may also be necessary to heat the mixture during ilmenite solution addition to prevent cooling. The mixture is heated by steam coils or by introducing live steam. The addition of the ilmenite solution is regulated so as to take place within a definite time period, for example, a period between about 5 and about 20 minutes. After the addition is completed, the mixture is maintained at the boiling point for period of about 1 to about 6 hours to obtain adequate yield and again optimum properties. At the end of the boiling, the mixture is filtered on a suitable filter, e.g. a plate and frame press or rotary filter, and the titanium hydrate cake thus obtained is washed and bleached. The bleaching may be carried out by any procedure conventionally employed for this purpose, for example, the reduction of the ferric ion present with zinc and sulfuric acid. The product is then rewashed and treated with suitable conventional conditioning agents, such as potassium sulfate, and finally it is calcined up to a temperature ranging from about 900° to about 1000° C., or it may be calcined at a constant temperature somewhere between 900–1000° C., as for example in a muffle furnace. The resulting pigment is finished in the usual manner.

The foregoing procedure will normally result in the formation of an anatase type pigment upon calcination of the titanium hydrate. However, the hydrate obtained in accordance with the present invention can readily be converted to the rutile structure by rutile seeding following standard procedures such as disclosed, for example, in U.S. Patent 2,494,492, to produce a rutile pigment of good quality.

The first aspect of the invention, namely, the preparation of titanium hydrate using as a starting material an uncrystallized and unconcentrated ilmenite solution is illustrated by the following examples, which are, however, not to be considered as limiting:

Example 1

Ilmenite ore was treated with 95% sulfuric acid to obtain a cake, which was dissolved in water, and the resulting solution filtered and heated to 91° C. The ilmenite solution had the following analysis:

$TiO_2$ ---------------- 145 g.p.l.
$H_2SO_4/TiO_2$ -------- 1.95:1 (weight ratio).
$FeSO_4/TiO_2$ -------- 2.10:1 (weight ratio), equivalent to 304.5 g.p.l. $FeSO_4$, or 112.05 g.p.l. $Fe^{++}$.

880 ml. of hot ilmenite solution was added gradually to 120 ml. of water at 91° C. during the course of 15 minutes, with mechanical agitation. The mixture was brought to a boil in 20 minutes and boiled until the color became a light grey. The agitation and heating were then discontinued for one-half hour. Thereafter the agitation was resumed and the mixture boiled for an additional 3 hours. The yield of titanium hydrate was 95%. The hydrate was processed in the usual manner by washing, bleaching, rewashing, and then conditioning with 0.1% $P_2O_5$ as phosphoric acid and 0.7% $K_2SO_4$ by weight, and calcined for 3 hours at 925° C. The calcined pigment was then wet ground, elutriated to eliminate coarse particles, coagulated, filtered, washed, dried, and micropulverized, thereby yielding an excellent pigment having a tinting strength of 1250 and a color number of 00, equaling the best commercially available pigments made by other methods, in color and covering power.

Example 2

A titanium hydrate produced in accordance with the process disclosed in Example 1 was washed and bleached with 3% rutile seed (produced in accordance with the disclosure of Patent 2,494,492). The hydrate was further washed and treated with 0.3% $K_2SO_4$ and 0.05% $Al_2O_3$ by weight and calcined for 3 hours at 925° C. The calcined pigment was processed as recited in Example 1, to yield an excellent rutile type pigment having a tinting strength of 1600, with excellent color.

Example 3

A small amount (approx. 5%) of titanium-bearing slag was mixed with ilmenite and reacted with sulfuric acid to produce a titanium solution. The solution was clarified to remove all solid matter. 855 ml. of this titanium solution at 96° C. and analyzing:

$TiO_2$ ---------------------------- 177 g.p.l.
$H_2SO_4/TiO_2$ -------------------- 1.80:1 (weight ratio).
$FeSO_4$ --------------------------- 264 g.p.l.

were added to 125 ml. of water at 100° C. in 16 minutes with mechanical agitation. The mixture was brought to a boil in 20 minutes and boiled 3 hours. The yield was 95.5%. The hydrate after washing, bleaching and rewashing was treated with 0.5% $K_2SO_4$ by weight and calcined for 3 hours at 920° C., to yield an excellent anatase pigment having a tinting strength of 1250 and a color equal to the best commercially available pigment.

In accordance with the second aspect of the novel process of this invention, there is employed as a seeding agent, by incorporating it in the hydrolysis water of the Blumenfeld procedure, a small proportion of ilmenite solution from which the excess $FeSO_4$ has been removed by crystallization, and which has been concentrated to a definite level of $TiO_2$ content. In the production of such solutions, it is conventional practice to remove iron to a level corresponding to an iron ratio ($FeSO_4/TiO_2$) of less than about 0.8:1. This solution with the iron removed cannot be used per se to make good pigment and experience has shown that it must be concentrated to a $TiO_2$ content of at least 200 g.p.l., and preferably above about 240 g.p.l. $TiO_2$. Thus, a crystallized and concentrated ilmenite solution as customarily produced, and which is suitable for use as a seeding agent in accordance with this invention, is composed of $TiO_2$, $FeSO_4$, and $H_2SO_4$, together with a small amount of trivalent Ti in the form of sulfate, plus possibly certain impurities derived from the ore. The $TiO_2$ concentration will normally range from about 240 to about 260 g.p.l.; $FeSO_4$ from about 170 to about 200 g.p.l.; and $H_2SO_4$ from about 450 to 550 g.p.l. However, all these figures are to be considered as illustrative, but not as limiting.

As pointed out previously, in the Blumenfeld procedure for hydrolyzing titanium solution to produce titanium hydrates, the heated titanium solution is added slowly to heated water, with agitation, and the resultant mixture is boiled for several hours to insure substantial recovery of the titanium values. At the start of the addition of titanium solution, the first few drops of solution are hydrolyzed, turning the water milky. Upon further addition of the solution, the milky appearance vanishes, apparently by dissolving. It is believed that actually this milkiness consists of micelles of hydrous titanium oxide dispersed throughout the solution-water mixture, which micelles form the seed to facilitate subsequent hydrolysis of the titanium values (autonucleation), to permit adequate recoveries and in such a form and particle size that filtration proceeds satisfactorily, and upon calcination a good quality pigment is produced. It is these first few minutes of the addition that influence and regulate the entire hydrolysis.

Where, as in accordance with the first aspect of the present invention, uncrystallized and unconcentrated ilmenite solutions are to be thus hydrolyzed, the hydrolysis conditions must be carefully controlled to avoid variations in pigment quality.

In accordance with the second aspect of the present invention, it has been found that the need for such exact controls can be very simply and expeditiously eliminated.

I found that by first adding to the heated hydrolysis water in the Blumenfeld procedure a small amount of crystallized and concentrated ilmenite solution as normally obtained in ilmenite processing, hydrolysis micelles can be produced in situ in said heated water to serve as seeding means. The crystallized and concentrated ilmenite solution thus acts as a seeding agent. Thereafter, there is immediately added to the hydrolysis water the uncrystallized and unconcentrated ilmenite solution, gradually and with agitation, as described previously, and in Examples 1 and 2.

The amount of crystallized and concentrated ilmenite solution thus used as a seeding agent may comprise as little as about 3% of the total volume of titanium solution to be hydrolyzed, with excellent results. There is no particular upper limit to be observed, other than that indicated by economic or operating factors. Generally from about 4% at least, to 10% or more, and preferably from about 4 to about 6% of the volume of total ilmenite solution to be hydrolyzed is employed for this purpose. The hydrate thus produced is excellent for manufacturing either anatase or rutile type pigments, since rutile seeding may also be employed in connection therewith. The boiling and subsequent finishing steps are conducted as previously described.

The following examples serve to illustrate the second aspect of the invention, without however, being considered as limiting:

Example 4

A solution of titanium to serve as a seeding agent was prepared by setting aside a portion of a crystallized and concentrated ilmenite solution as obtained in the usual processing of the ore, having the following analysis:

| | |
|---|---|
| $TiO_2$ | 249 g.p.l. |
| $H_2SO_4/TiO_2$ | 1.90:1 (weight ratio). |
| $FeSO_4/TiO_2$ | 0.8:1 (weight ratio). |

100 ml. of the above solution was heated to 96° C. and added during the course of 1 minute to 375 ml. of water having a temperature of 96° C., with agitation.

A quantity of 2,400 ml. of an uncrystallized and unconcentrated ilmenite solution to be hydrolyzed, having the following analysis, was prepared:

| | |
|---|---|
| $TiO_2$ | 149 g.p.l. |
| $H_2SO_4/TiO_2$ | 1.9:1 (weight ratio). |
| $FeSO_4/TiO_2$ | 1.97:1 (weight ratio). |

This solution was heated to 96° C. and added to the hot water-seeding agent mixture immediately after the addition of the latter, and during the course of 16 minutes. The mixture was brought to boiling in 10 minutes and boiled for 5 minutes, at which time it had acquired a grey tone. The heating was discontinued and the agitation stopped for ½ hour. The mixture was then boiled an additional 3 hours. The yield was found to be 95.3% $TiO_2$ recovered in the form of precipitate, having excellent filterability. The hydrate was filtered, washed, bleached, rewashed, and treated with 0.1% $P_2O_5$ as phosphoric acid and 0.6% $K_2SO_4$ by weight, and calcined for 3 hours at 92.5° C. The pigment after suitable grinding was of excellent color and tinting strength, identical with that of commercially available anatase pigments.

Example 5

The hydrate produced in accordance with the method of Example 4 was washed and bleached with 3% rutile seed (produced in accordance with the disclosure of Patent 2,494,492), and further worked up as described in Example 2. The resulting rutile type pigment exhibited excellent tinting strength and color.

I claim:
1. The method of preparing a titanium hydrate suitable for the manufacture of titanium pigments which have good color and high covering power, which comprises first adding gradually to heated water maintained at a temperature between about 85° C. and about 100° C. a small amount of a seeding agent comprising a concentrated solution of ilmenite in sulfuric acid from which iron has been removed to a level corresponding to a weight ratio of $FeSO_4:TiO_2$ of less than about 0.8:1 and which has been concentrated to a $TiO_2$ content of at least 200 grams per liter, then hydrolyzing an uncrystallized and unconcentrated solution of ilmenite having a titanium dioxide content from about 110 to about 150 grams per liter in sulfuric acid, said unconcentrated ilmenite solution containing above about 80 grams per liter of ferrous ion, by adding such solution gradually to said mixture of seeding agent and heated water maintained at a temperature between about 85° and about 100° C. until the addition is complete, the amount of seeding agent comprising at least 4% of the total volume of ilmenite solution to be hydrolyzed, the proportion of added ilmenite solution comprising between about 75% and about 96% of the total volume of solution and seeded water, boiling the mixture to complete the hydrolysis, and recovering the resulting titanium hydrate.

2. The method of claim 1 in which the $TiO_2$ content of the seeding agent is between about 240 and about 260 grams per liter.

3. The method of claim 1 in which the titanium hydrate formed is further converted to the rutile type by washing and bleaching with rutile seed.

References Cited in the file of this patent

UNITED STATES PATENTS

| | | |
|---|---|---|
| 1,333,819 | Jebsen | Mar. 16, 1920 |
| 1,333,849 | Olsen | Mar. 16, 1920 |
| 1,851,487 | Blumenfield | Mar. 29, 1932 |
| 2,049,504 | Krchma | Aug. 4, 1936 |
| 2,121,215 | Weise et al. | June 21, 1938 |
| 2,361,987 | Booge | Nov. 7, 1944 |
| 2,494,492 | Ross et al. | Jan. 10, 1950 |

OTHER REFERENCES

Barksdale book on "Titanium," 1949 ed., pages 33 and 141, The Ronald Press Co., N.Y.

Thornton's book, Titanium, 1927 ed., page 160, The Chemical Catalog Co., Inc., N.Y.